US007301658B2

(12) United States Patent  (10) Patent No.: US 7,301,658 B2
Henry  (45) Date of Patent: Nov. 27, 2007

(54) DEVICE TRANSMISSION TRACKING

(75) Inventor: Steven G. Henry, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 10/126,005

(22) Filed: Apr. 19, 2002

(65) Prior Publication Data

US 2003/0200266 A1    Oct. 23, 2003

(51) Int. Cl.
*H04N 1/00* (2006.01)
*G06K 15/00* (2006.01)

(52) U.S. Cl. .................... 358/1.15; 358/407; 358/400; 358/405

(58) Field of Classification Search ................ 358/400, 358/401, 474, 475, 443, 444, 405, 407, 1.15
See application file for complete search history.

(56) References Cited

U.S. PATENT DOCUMENTS 5,222,136 A * 6/1993 Rasmussen et al. ........ 380/266
5,291,302 A * 3/1994 Gordon et al. .............. 358/400
6,642,959 B1 * 11/2003 Arai ........................ 348/231.3
6,784,924 B2 * 8/2004 Ward et al. ............... 348/207.1
6,812,962 B1 * 11/2004 Fredlund et al. ......... 348/231.2
6,877,032 B1 * 4/2005 Philyaw ...................... 709/217
6,912,402 B1 * 6/2005 Haumont et al. ........... 455/519
6,944,863 B1 * 9/2005 Ward et al. ................. 719/310
2001/0021037 A1 * 9/2001 Itoh ........................... 358/1.15
2002/0132609 A1 * 9/2002 Lewis et al. ................ 455/412
2002/0141656 A1 * 10/2002 Niikawa et al. ............ 382/276
2003/0166443 A1 * 9/2003 May .......................... 493/320
2004/0105008 A1 * 6/2004 Yamazaki ................. 348/207.1

FOREIGN PATENT DOCUMENTS

JP        404296138    * 10/1992
JP       2002334042    * 11/2002

* cited by examiner

*Primary Examiner*—Jerome Grant, II

(57) ABSTRACT

An object is optically scanned to form a corresponding message data in storage. The message data is transmitted over an interconnecting network to an address of an addressed recipient. After receiving an acknowledgement of receipt of the message data from the addressed recipient through the interconnecting network, the message data in storage is deleted.

42 Claims, 9 Drawing Sheets

Fig. 1

| Log File Entry Number "*i*" |
|---|
| Job Tracking History |
| User Identification |
| Account Number |
| Address(es) and Corresponding Flag(s) |
| Update Time Stamp |
| Size (MB) |
| Number of Scanned Pages |
| Job Status |
| Number of Retries |
| Document Type |
| Job Image Data |
| Bit Map Data / Format A |
| *.PDF Data/ Format B |
| Log File Entry Number "*i* + 1" |

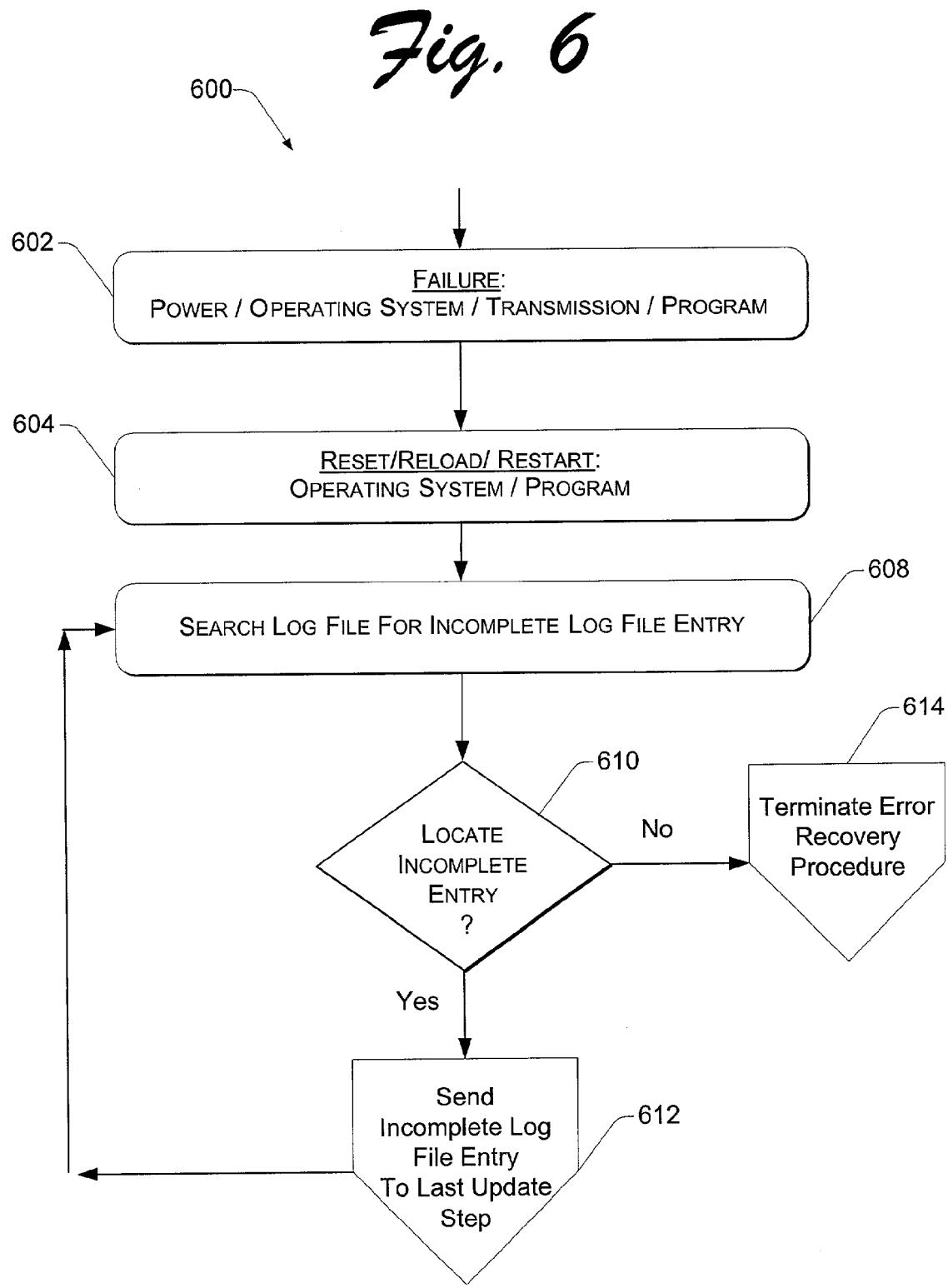

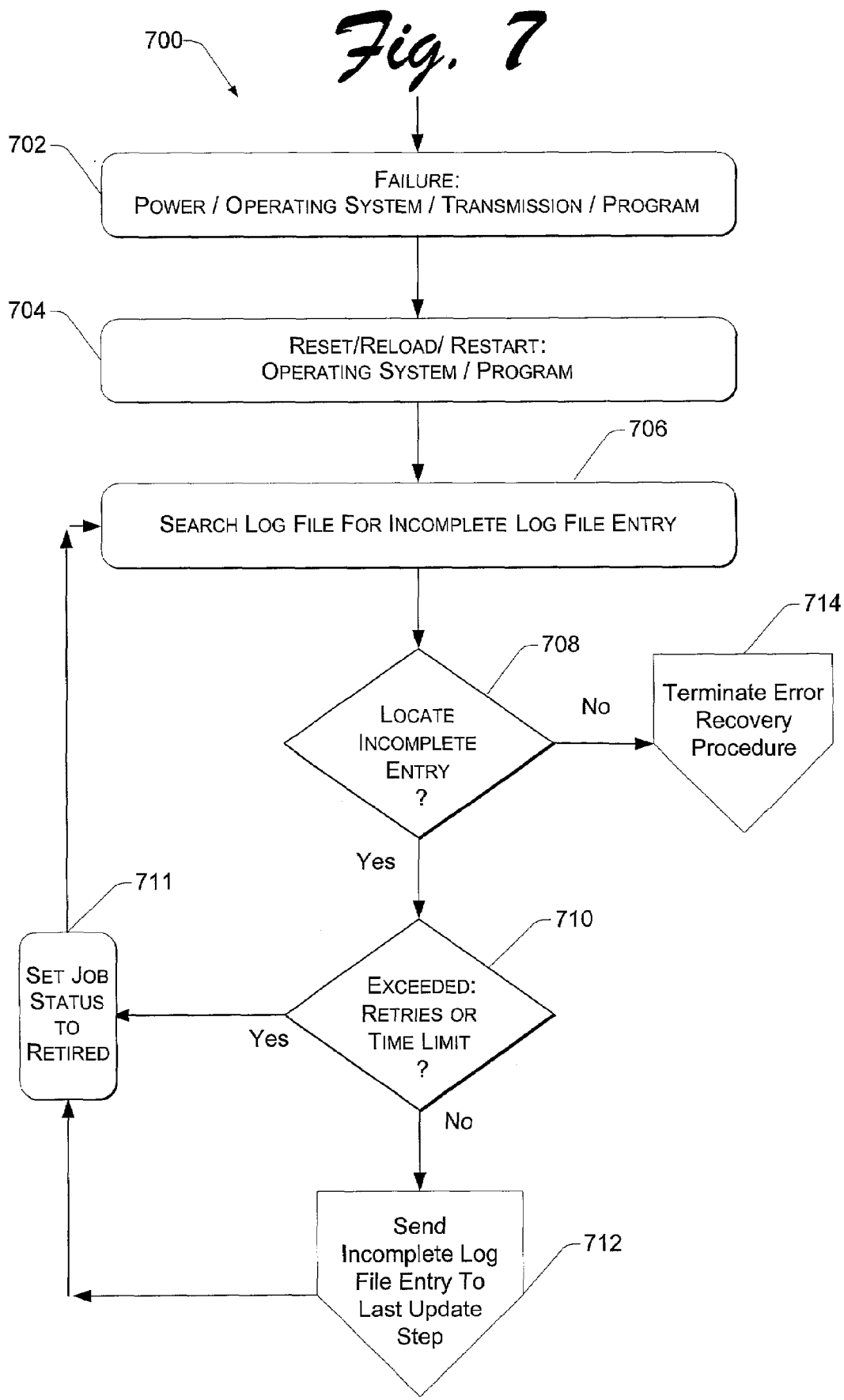

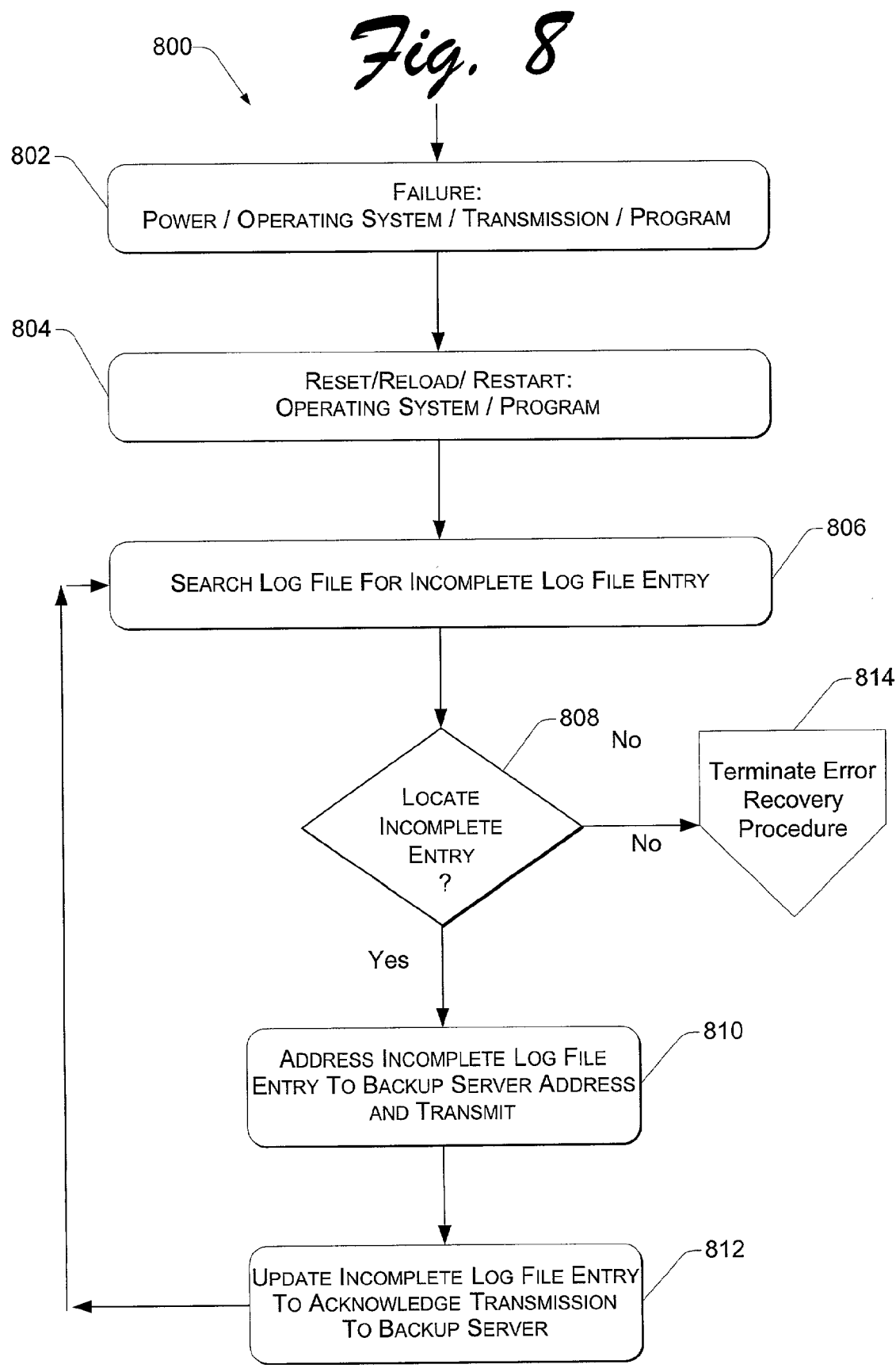

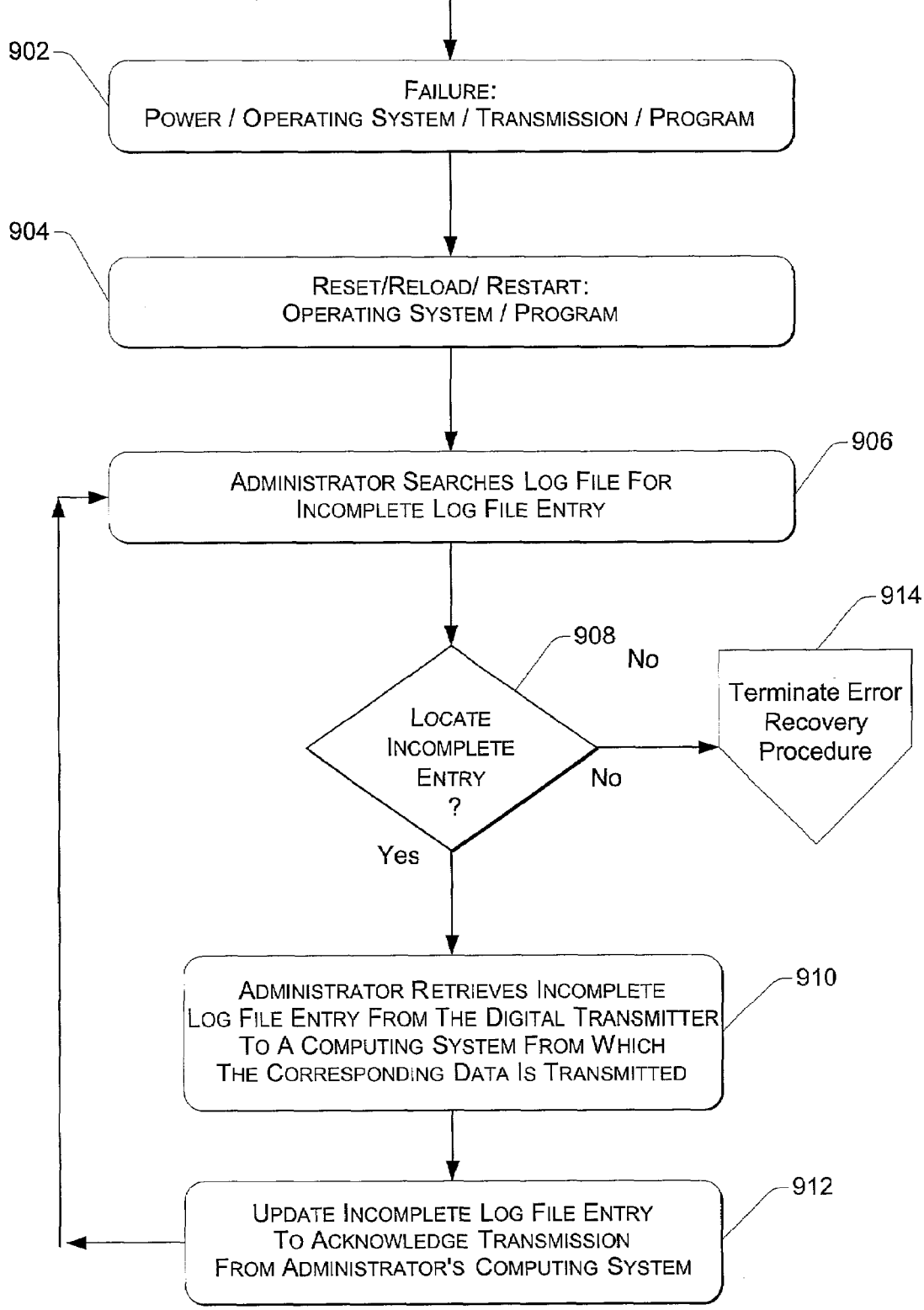

DEVICE TRANSMISSION TRACKING

FIELD OF THE INVENTION

The present invention relates generally to peripheral devices, and more particularly to tracking transmissions of a transmitter device.

BACKGROUND OF THE INVENTION

Many peripherals to computer networks include a scanner component. One example of such a peripheral is an "All-in-one", also known as a multifunction peripheral (MFP) in that it has the capability to perform the multiple functions of scanning hardcopy documents, copying, and printing. Another example is a digital network copier that scans in documents from an automatic document feeder, does high volume copying, and has the capabilities of binding, collating, folding, stacking, stapling, stitching, edge-trimming, paginating, and printing on substrates of varied composition. Each of these peripherals, when in communication with an interconnecting network, can also be described as being a transmitter device. A transmitter device is an appliance that has an input device (e.g. a keyboard), a display, and a scanner. The transmitter device need not have a printer. A digital camera is a type of transmitter device, but in comparison to the foregoing, it is not as useful for handling documents and typically lacks the resolution and ability to rapidly and repetitively transfer information after scanning to a repository.

In an exemplary digital transmitting operation, a hardcopy of a document or other physical object can be presented to the scanner portion of a transmitter device. After scanning, the transmitter device transforms the scanned image into a digital representation that is then saved in a first data format. A process might then be activated to convert the data in the first format into a second format. By way of example, the data in the first format can be a bit map, a graphical image file format (*.GIF) file, or a tagged image file format (*.TIF) file, and the data in the second format can be a Portable Document Format (*.PDF) file. The conversion from the first to the second data formats can cause a transmitter device to experience an operational failure. If an operational failure does not occur, message data can be electronically transmitted. The message data contains a digital representation of the scanned document in one of the data formats. The message data is addressed to a recipient address on an interconnecting network. The recipient address can be an electronic mail (email) address at an email server, a destination web site, a local file folder at a document server, a facsimile server, or another similar location. The transmitter device can attach the digitized representation of the scanned pages to the message data. The message data and its attachment can be sent to one or more addresses for one or more recipients over the interconnecting network. Each recipient can have an address that a user manually enters at the transmitter device or that a user specifies using a predefined defined list of recipient addresses that can be stored in a memory of the transmitter device.

A transmitter device will typically generate a log file that contains an entry for each transmission of message data that is to be sent from the transmitter device. For each transmission that is to be sent, the entry in the log file can include the address of who the transmission is to be sent to, the time and date of when the transmission was sent, and the size of the transmission to be sent. If a first attempt at sending a transmission from the transmitter device fails, the transmission process is stopped and the log file can be printed. When the transmitter device is powered down or loses power, the log file and the information therein can be lost. It would be beneficial to utilize the information in the transmission log file of a transmitter device. Consequently, there is a need for improved methods, programs, transmitter devices, and systems that can provide such a capability.

SUMMARY OF THE INVENTION

The above-stated needs and/or others are met, for example, by methods, programs, transmitter devices, and systems for optically scanning at least one object to form a corresponding message data in storage. The message data is transmitted over an interconnecting network to an address of an addressed recipient. After receiving an acknowledgement of receipt of the message data from the addressed recipient through the interconnecting network, the message data in storage is deleted.

These and other features of the present invention will become more fully apparent from the following description and appended claims, or may be learned by the practice of the invention as set forth hereinafter.

DESCRIPTION OF THE DRAWINGS

A more complete understanding of the various methods, programs, transmitter devices, and systems of the present invention may be had by reference to the following detailed description when taken in conjunction with the accompanying drawings wherein the same reference numbers are used throughout the drawings to reference like components and features, and wherein:

FIG. 1 illustrates an example, according to an embodiment of the present invention, of a table depicting a log file for a transmitter device.

FIGS. 6-9 each depict a flow diagram of an error recovery procedure, according to respective embodiments of the present invention, to monitor a transmitter device log file to identify and recover from a transmission that is recorded as being either unsent or sent but not received.

DETAILED DESCRIPTION

Figure 2:
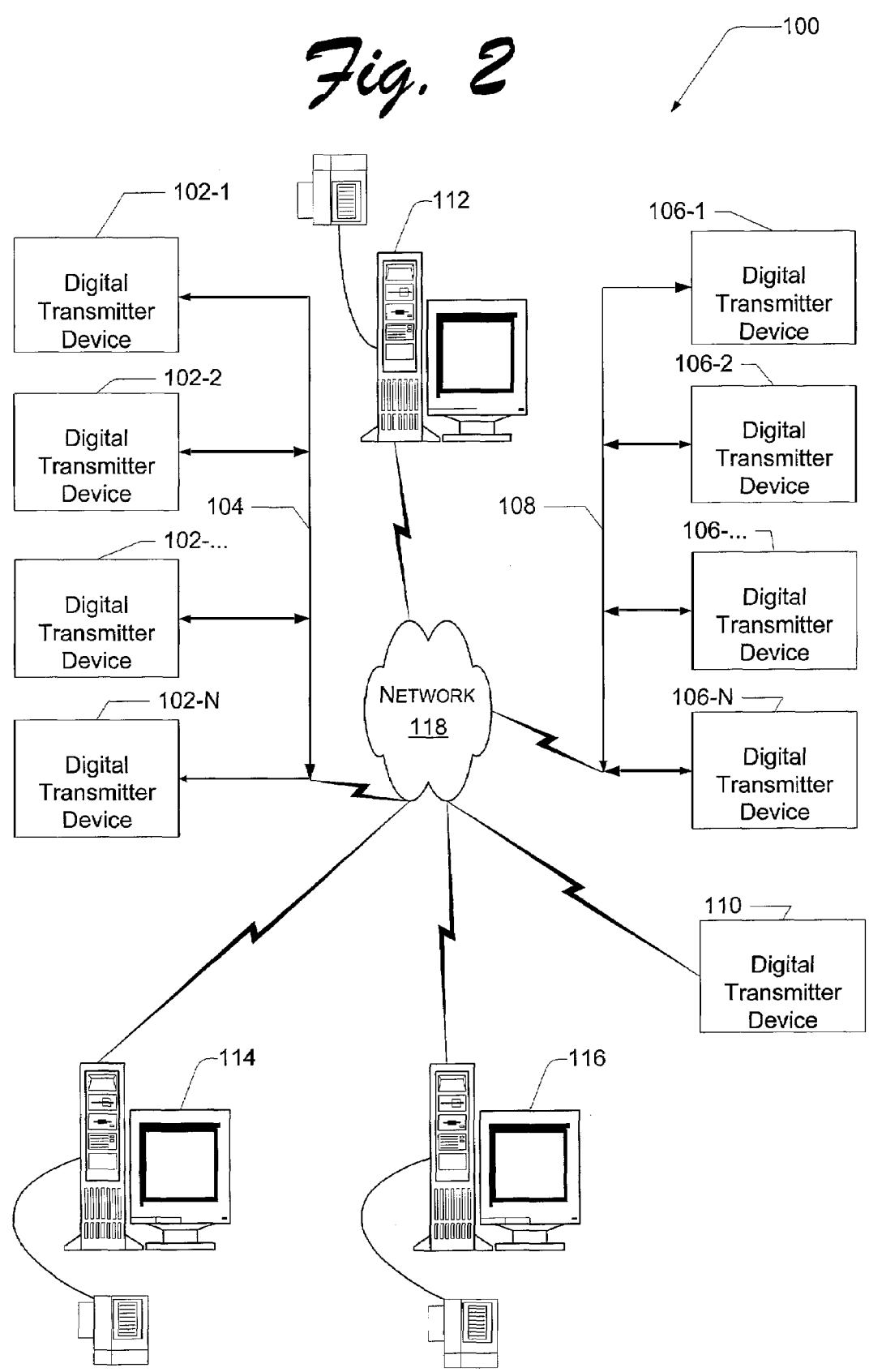
FIG. 2 is a block diagram, according to an embodiment of the present invention, depicting a computing and communication environment having transmitter devices in a system environment suitable for providing local access to the transmitter devices.

The methods, systems, and programs described herein, according to various embodiments of the present invention, relate to the transmission of message data in a transmission from a transmitter device to a specific address. The message data can be addressed to an electronic mail (email) address, a destination web site, a local file folder, or another similar location on an interconnecting network. The initiation of a transmission from the transmitter device causes the posting of the message data that is to be sent in entry to a log file.

When a transmission is sent from a transmitter device, the message data can include an image that is captured by the transmitter device using a scanning mechanism. The message data also includes a designated address on an interconnecting network. The transmitter device transmits the message data in a transmission that is addressed to the designated address on the interconnecting network. The transmitted message data can be sent either directly from the transmitter device to the interconnecting network, or through a wired or wireless link to an intranet and from there to the interconnecting network.

The transmitter device polls its log file to determine if a transmission was to be sent but was not, or if a transmission was sent but the transmitter device had not yet received an acknowledgement that the transmission had been received. These discrepancies can then be reported into the log file or they can be transmitted in message data to an address of an administrative entity for an interconnecting network to which the transmitter device is in communication.

In one embodiment of the present invention, the message data can be kept in storage in the transmitter device until an acknowledgement of receipt is received at the transmitter device from the intended recipient. If the acknowledgement is not received after a number of retransmissions and/or the expiration of a predetermined period of time, an apparent failure has occurred which can then be reported into the log file as a discrepancy. The transmitter device can attempt to recover from each transmission failure, thereby building in a redundancy to prevent lost transmissions. As such, one or more transmission recovery mechanisms can be applied.

In another embodiment of the present invention, the message data can be kept in storage either in the transmitter device or on a local server until an acknowledgement of receipt is received either at the digital sender or at the server. It could also be kept at both locations for even greater redundant reliability. Further, a brief email message can be sent to the recipient that doesn't include the scanned information but does indicate that a document will be coming in a different email so as to mitigate any undesirable situations that might occur in a network where longer documents can be discarded.

In one embodiment of the present invention, the message data can be kept in storage in the transmitter device until it has been recorded in the log file as having been transmitted. By way of example, the transmitter device can lose power or experience a program or machine malfunction so as to cause an apparent failure to transmit. Then, the operating system of the transmitter device can be reloaded. Upon system initialization, the transmitter device displays a prompt upon a user interface to request whether the unsent message data stored in the transmitter device should be sent. Alternatively, upon system initialization, the transmitter device can automatically retry to transmit the unsent message data stored in the transmitter device. As such, a retry mechanism can continue to attempt to transmit unsent message data every predetermined time period up to a predetermined number of retries. An administrator for the transmitter device can set these and other predetermined quantities in a configuration routine using the local user interface at the transmitter device or using a remote connection to the transmitter device through an interconnecting network.

In another embodiment of the present invention, if an acknowledgement is not received at the transmitter device from an intended recipient, the transmitter device can attempt a predetermined number of retransmissions to the address for a predetermined period of time. If an acknowledgement from the intended recipient has not been received at the transmitter device after the predetermined number of retransmissions and/or the expiration of the predetermined period of time, the apparent failure occurrence can be recovered from. To recover, the transmitter device can transmit the message data stored at the transmitter device to a predetermined alternative address on the interconnect network. Upon an optional receipt of an acknowledgement from the predetermined alternative address, the message data can be purged from the log file at the transmitter device. By way of example, the transmission of message data stored at the transmitter device can be redirected to a backup server, such as a backup email server, a backup fax server, and/or a backup document server.

Whenever a discrepancy or apparent failure to transmit or to receive a transmission has occurred at a transmitter device, tracking and failure information can be recorded in the log file at the transmitter device. Additionally, tracking and failure information can be sent to an administrator and/or user of the transmitter device via a local user interface at the transmitter device or by a transmission of a diagnostic to a predetermined address through the interconnecting network. The administrator for the transmitter device can specify the alternative address for one or more backup servers, each of which can be tried for successful transmission from the transmitter device in a predetermined order as specified by the administrator. The administrator can also have the ability to extract message data stored at the transmitter device, particularly that which is either unsent or unreceived, for removal to a separate computing system. The administrator can then use the computing system to transmit the extracted message to the originally intended address on the interconnecting network. The mechanism by which the ability is afforded to the administrator to pull off any unsent documents, emails, and/or log files directly from storage at the transmitter device can be a utility program that is operated remotely by a personal computer (PC) on the interconnecting network. Accordingly, with respect to a job consisting of unsent or unreceived message data that is stored at a transmitter device, the administrator can manipulate the job, reroute the job, transmit the job to another address on the interconnecting network, print out the job, and/or copy the job to a back up storage location.

The log file stored at a transmitter device can be updated throughout the process of successfully transmitting a job. When a discrepancy or apparent error occurs at the transmitter device, the occurrence is recorded in the log file. The log file can be copied, automatically and/or by an administrator, to a computing system on the interconnecting network. As such, the log file is saved remotely even through the log file might be deleted locally at the transmitter device when it is shut down, loses power, or experiences an error in a program or its operating system.

A practical example of the foregoing, which is given solely by way of example and not by way of limitation, a user can place a stack of paper in a sheet feeder of a transmitter device. Each paper bears an image of an invoice. The user initiates a scanning mechanism of the transmitter device. The transmitter device then scans the stack of invoices and converts the same into a first data format that is stored on a hard drive storage component of the transmitter device. The data in the first format is then converted into a second data format in back ground processing by the transmitter device. This background processing can also be done while co-processing another stack of papers being scanned at the transmitter device. If the operating system of the transmitter device fails (e.g. crashes) during any portion of this process up to and including a transmission of message data to an intended recipient, upon reloading of the operating system, the transmitter device can attempt a recovery procedure. The recovery procedure can proceed in background processing to automatically attempt to continue processing the data in the first and/or second formats through to successful acknowledgement of transmission of the invoices to an intended recipient. Alternatively, or in addition thereto, an administrator of the transmitter device can check the log file of the transmitter device to locate an incomplete job or other discrepancy. From this, the administrator can derive the specifics of the intended transmission, the point of failure, and other information in order to proceed with an alternative choice of transmission recovery procedures. Following recovery, the log file can purged of message data for the successfully transmitted job.

In an alternative embodiment of the present invention, a network device such as a server, in communication with a plurality of transmitter devices through the interconnecting network, polls the contents each transmission log file to determine if a transmission was to be sent from a transmitter device but was not, or if a transmission was sent from a transmitter device but the transmitter device had not yet received an acknowledgement that the transmission had been received. These discrepancies can then be reported, such as by sending a diagnostic email to an address of an administrative entity for the interconnecting network. Additionally, corresponding message data can be purged from the log file at either the transmitter device or at the associated server. A configuration can also be had whereby a remote log service keeps a running log that need not be deleted.

Once the transmitter device has received an acknowledgement that its transmission had been received by the intended recipient, some or all of the corresponding message data is purged from the log file at the transmitter device.

An example of an entry in a log file of a transmitter device is seen in FIG. 1. The entry shown completely is Log File Entry Number "i". Log File Entry Number "i+1" is shown incompletely. Each entry has two components, which are a Job Tracking History and a Job Image Data. The Job Tracking History has several subcomponents, including a User Identification, an Account Number, one or more addresses and a corresponding flag for each indicating an acknowledged receipt of a transmission from an addressed recipient, an Update Time Stamp, a Size, a Number of Scanned Pages, a Job Status, a Number of Retries, and a Document Type. The Job Image Data components have two subcomponents, including a Format A subcomponent and a Format B subcomponent.

The User Identification subcomponent can be a password, Public Key Infrastructure string, sign on string, log on name, user name, or other identifier string by which a user of a transmitter device can be identified. The Account Number subcomponent provides identification of an account to which a job applies. The Address subcomponent contains one or more addresses for a respective one or more locations at an email server, a facsimile server, a document server, or other locations on an interconnecting network to which the transmitter device is in communication. The Update Time Stamp subcomponent identifies the date and time of the last successful process executed at the transmitter device for the job of the log file entry. The Size subcomponent measures (e.g. in megabytes) the Job Image Data subcomponent. The Number of Scanned Pages subcomponent is a measure of the number of pages in a job that has been fed from a sheet feeder into a scanner mechanism of the transmitter device. The Job Status subcomponent identifies the last successful process executed at the transmitter device for the job of the log file entry. The Number of Retries subcomponent quantifies the number of times that the transmitter device has attempted to complete the job to the point that the job has been acknowledged as having been successfully received at an addressed recipient. The Document Type subcomponent identifies the type of address to which a document for the job entry is transmitted. These address types can be, but are not limited to, an email server address, a facsimile server address, a destination web site address, a local file folder at a document server, or another location on an interconnecting network. The Job Image Data component can contain a significantly larger amount of data in its two subcomponents than the Job Tracking History component. The Format A subcomponent can include a bit map for each of one or more pages scanned by the transmitter device. Format A can also be a *.TIF file format. The Format B subcomponent can contain a transformation of the data in the Format A format into a Portable Document Format (*.PDF) file format. The Log File Entry Number "i+1" can contain similar categorized data as the Log File Entry Number "i".

Exemplary System for Configuration of a Transmitter Device

FIG. 2 illustrates an example of a system environment 100 suitable for implementing an embodiment of the present invention. The system environment 100 contemplates a plurality of intranets 104, 108 each of which, respectively, provides communications among one or more transmitter devices 102-*i* through 102-N and 106-*i* through 106-N. Each intranet 104, 108 is in communication with an interconnecting network 118. A stand alone transmitter device 110 is in communication with interconnecting network 118, as are servers 112, 114, and 116. By way of example, any or all of servers 112, 114, and 116 can be an email server, a server for a destination web site, a document server, a facsimile server, or another similar location. Alternatively, one or more of servers 112, 114, and 116 can be a computing system that provides remote access to one or more transmitter devices 102-*i* through 102-N, 106-*i* through 106-N, and 110. Each such computing system is depicted as having local access to a printer. An administrator for the transmitter devices can use such one or more of the computer systems to remotely access one or more of the digital devices through interconnecting network 118.

Local access to each transmitter device can be provided through an input device, such as a touch sensitive menu screen, on each transmitter device 102, 106, and 110. A user accesses the input device for the purpose of entering commands to the transmitter device, as well as for other input such as a textual message and a desired address to which scanned documents are to be transmitted.

Transmitter devices 102, 106, and 110 generally include peripheral devices and stand-alone devices. Although in FIGS. 2 and 4 transmitter devices 102, 106, and 110 as shown as digital transmitter devices, transmitter devices 102, 106 and 110 may be analog or digital transmitter devices or a combination of both. Peripheral devices include devices such as printers, scanners, copiers, and fax machines, or multifunction peripheral (MFP) devices that combine two or more peripheral devices into a single device.

Stand-alone devices include certain peripheral devices that often function while uncoupled or isolated from other devices. Transmitter devices 102, 106, and 110 therefore include devices such as copiers, scanners and fax machines like those shown in FIG. 2, discussed below.

Transmitter devices 102, 106, and 110 are generally distinguishable from devices such as laptop PCs (personal computers) and pocket PCs by their limited purpose and limited user interface or input/output capabilities. For example, a typical user interface for a transmitter device includes a front menu panel with limited screen space and a limited number of buttons. In addition, transmitter device 102, 106, and 110 is typically oriented toward performing one general task such as scanning. By contrast, devices such as laptop and pocket PCs often provide multiple and varied means of input/output such as a full screen display, a QWERTY keyboard, a trackball mouse, speakers, microphones, PCMCIA (Personal Computer Memory Card International Association) slots, portable media drives and the like. These devices are capable of performing multiple functions through executing various software applications such as word processing applications, spreadsheet applications, financial applications, network browsers and network messaging applications.

Interconnecting network 118 is representative of one or more communication links, either wired or wireless, that are capable of carrying data between servers and/or computing systems 112, 114, 116 and other network resources in communication with interconnecting network 118. In certain exemplary implementations, interconnecting network 118 includes a local area network (LAN), a wide area network (WAN), an intranet, the Internet, or other similar network. Server 112, 114, 116 and intranets 104, 108, 112, as seen in FIG. 2, are typically coupled to interconnecting network 118 through a network connection.

Each transmitter device 102-i, 106-i, and 110 will preferably have an input device to receive an address and message text that can be input by a user using a user interface. Alternatively, a default address or a list of selectable addresses can also be stored at each transmitter device 102-i, 106-i, and 110. Preferably, each transmitter device 102-i, 106-i, and 110 will have an imaging or scanning mechanism to receive and digitize an image of an object. The image of the object can then be sent in a file attached to an electronic transmission that is addressed to the input, default, or selected address from each transmitter device 102-i, 106-i, and 110 through the respective intranet 104, 108 and/or directly to interconnecting network 118.

Figure 3:
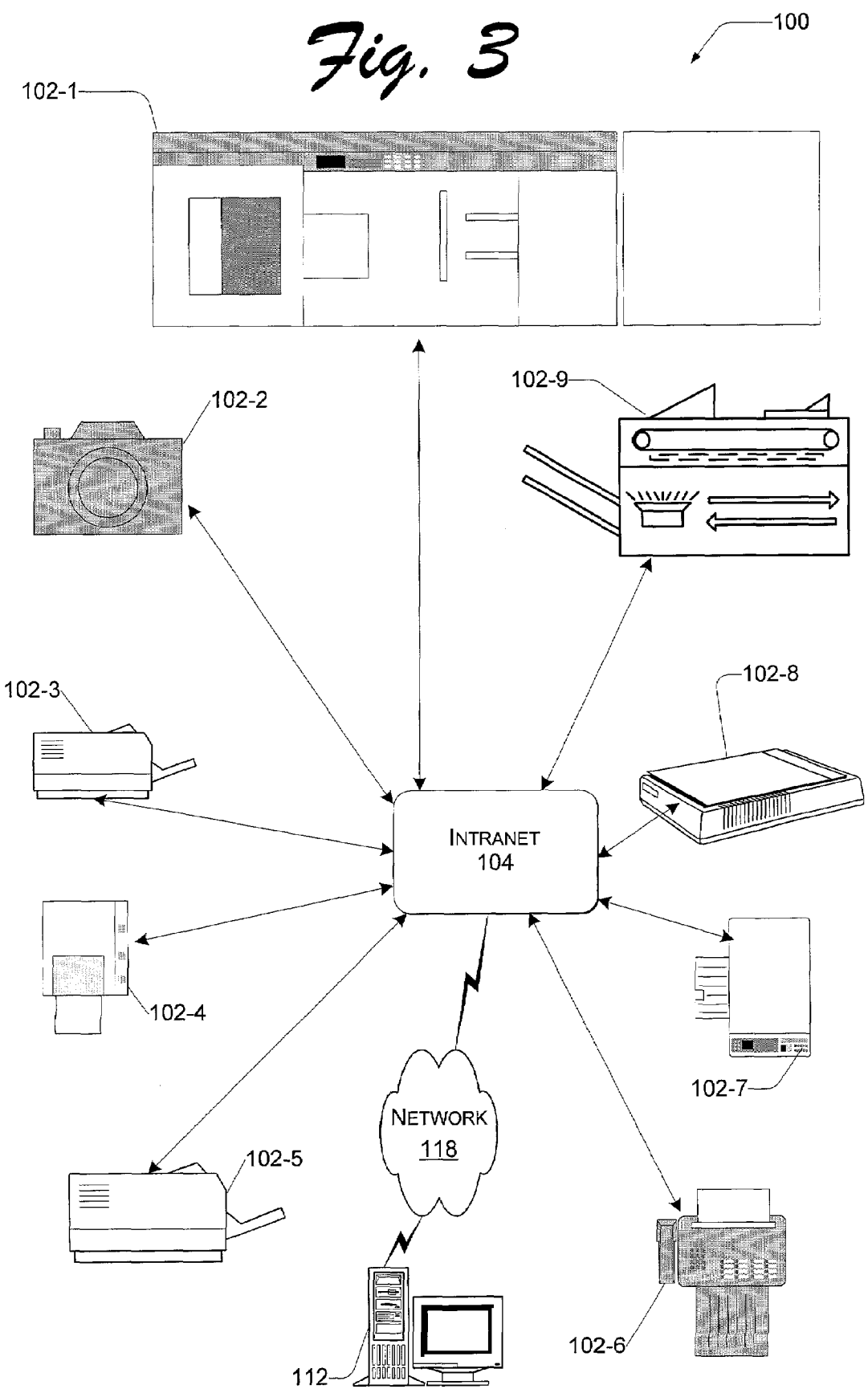
FIG. 3 illustrates various transmitter devices that provide local access for input thereto according to an embodiment of the present invention.

FIG. 3 shows a variety of transmitter devices 102-1 through 102-9 that can be in communication with server or computing system 112 through wired or wireless links to intranet 104 through interconnecting network 118. Transmitter device 102-2 is intended to represent both a digital camera and a type of portable hand held scanner to capture and digitize images. Also shown are various multifunction peripherals (MFPs) 102-3 through 102-5, 102-7, and 102-9. FIG. 3 also depicts a facsimile machine 102-6, a desk top scanner 102-8, and a digital network copier 102-1.

The user of each transmitter device 102-i, 106-i, and 110 can transmit message data therefrom to the respective intranet 104, 108, or directly to interconnecting network 118 by a wired or wireless link. A wireless link can be through an Infrared (IR) data connection or other wireless data connections such as the Blue Tooth protocol. The wireless link may be made through radio frequency (RF) or infra-red (IR) data ports. By way of example, each transmitter device 102-i, 106-i, 110 can include the capabilities of a cordless handset telephone, a cellular telephone, a personal digital assistant (PDA), a pager, a watch and the like, any of which is also capable of transmitting data in a wireless manner. A wired link can be performed through a USB data connection, a serial port connection, a parallel port connection or via other known data transmission standards and modes. The wired link may be implemented through standard RS232 cable, Universal Serial Bus (USB) cable, or Fire Wire™ connection data ports. As such, each transmitter device 102-i, 106-i, 110 can transmit by one or both of a wireless or wired link.

Exemplary System for a Transmitter Device in Communication with a Server

Figure 4:
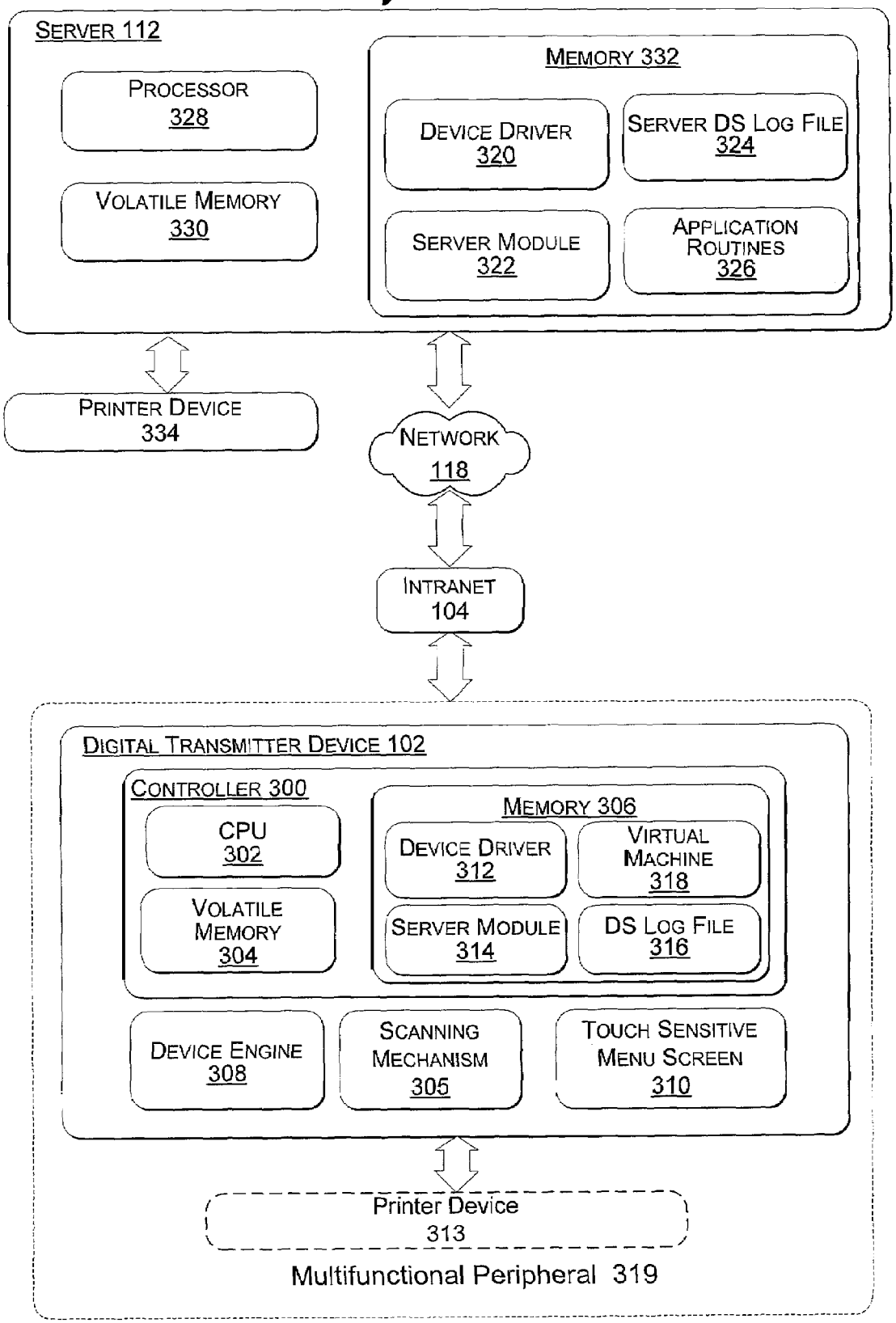
FIG. 4 is a block diagram, according to an embodiment of the present invention, illustrating a transmitter device in communication with an intranet through a wired or wireless link, where the intranet is in communication through an interconnecting network to a server.

The system 100 of FIG. 4 includes transmitter device 102 as a peripheral device coupled by a wired or wireless link to intranet 104. Intranet 104 is coupled by interconnecting network 118 to server 112. As such, FIG. 4 illustrates an embodiment of the system 100 of FIG. 2 in greater detail. In accordance with still other aspects of the present invention, transmitter device 102 may be included within a multiple function peripheral (MFP) device 319. As its name implies, the MFP device 319 is configured to provide multiple functions. In this example, the functions provided by the MFP device 319 include those provided by transmitter device 102 and a printer device 313. Consequently, the user of transmitter device 102 may also print out a hardcopy of any applicable portions of data stored or otherwise acquired by transmitter device 102.

In general, transmitter device 102 uses a controller 300 to execute a program so as to transform data to a driver format suitable for printing with integral printer device 313, such as a mark up language format (e.g. SMGL, HTML, or XML), or such as a job language format (e.g. PCL or postscript). Printer device 313 can have the capability of converting data and then outputting it onto an appropriate print media, such as paper, transparencies or glossy photo paper.

Transmitter device 102 includes one or more CPUs 302 each of which is operatively coupled to a memory 306, and a user interface that includes an input device. Preferably, the input device will be locally accessible at transmitter device 102. By way of example, the input device can be a touch sensitive menu screen 310. Transmitter device 102 also includes a scanning mechanism 305 and at least one communication port for interfacing with the intranet 104. In the alternative, transmitter device can be connected directly to interconnecting network 118, through either a wired or wireless link, without first connecting to intranet 104.

When included in MFP device 319, CPU(s) 302 would also be operatively coupled to printer device 313, for example. CPU(s) 302 is representative of any hardware, firmware and/or software that is configured to perform certain functions associated with the operation of transmitter device 102. Hence, as those skilled in the art will recognize, CPU(s) 302 may include dedicated logic and/or one or more processors configured in accord with software instructions, for example.

Memory 306 is representative of any type of data storage mechanism that can be accessed by at least CPU(s) 302. Memory 306 may therefore include, for example, some form of random access memory (RAM), some form of read only memory (ROM), and/or other like solid-state data storage mechanism. Memory 306 may include a magnetic and/or optical data storage mechanism. Scanning mechanism 305 is representative of any optical scanner technology that may be employed to produce scanned object data upon scanning an object. Such scanning technologies are well known. The resulting scanned object data is provided to CPU 302 and/or stored in memory 306.

Controller 300 of transmitter device 102 typically includes data processing unit or CPU 302, a volatile memory 304 (i.e., RAM), and a non-volatile memory 306 (e.g., ROM, Flash). Transmitter device 102 also includes a device engine 308. The touch sensitive menu screen 310 acts as a local user interface for transmitter device 102 by displaying menu pages and accepting user input based on selectable menu items displayed on the menu pages. The touch sensitive menu screen 310 can be used to display a menu page that asks for and receives the input of an address to which to image data that is scanned with scanning mechanism 305 is to be transmitted in a message data transmission via intranet 104 and interconnecting network 118.

Controller 300 processes data and manages device functions by controlling device engine 308 and by responding to input from touch sensitive menu screen 310. Device driver software in a device server 212 can be stored in memory 306 and executed on CPU(s) 302. Memory 306 also includes a server module 314 configured to serve menu documents to the touch sensitive menu screen 310. The server module 314 is a local server in the sense that it is present within the same transmitter device 102 to which it serves menu documents.

Controller 300 includes a Transmitter device (DS) log file 316 that is stored in memory 306. DS log file 316 contains one or more entries, an example of which is given in FIG. 1 and the description thereof, above. Transmitter device 102 can be set up or configured to preserve the contents of any entries in DS log file 316 when transmitter device 102 is subjected to a failure. Failures, are used herein include but are not limited to the transmitter device being powered down, losing power, experiencing an error in a program being executed, and/or undergoing an operating system failure. Alternatively, DS log file 316 can be implemented as a component of volatile memory 304 so that the entries in DS log file 316 are not preserved but rather are erased when transmitter device 102 is subjected to a failure.

Graphical keys or buttons presented on menu pages that are displayed by the touch sensitive menu screen 310 offer selectable menu items that are described by accompanying textual information. Menu documents 316 driving the menu pages include embedded code associated with graphical keys. Selecting a menu item by pressing a graphical key on the touch sensitive menu screen 310 triggers an event which causes a "virtual machine" 318 to interpret and execute the code associated with the selected graphical key. As such, the virtual machine 318 can be a software module stored in memory 306 that executes on CPU(s) 302 to interpret and execute code, including code that is associated with the enablement of a transmission recovery procedure for message data to be transmitted from transmitter device 102. The code can be a script code that is written in JavaScript™ code and that is interpreted and executed on a Java™ Virtual Machine (JVM) 318. The script code can also be written in ChaiServer™ code that is interpreted and executed on a Chai™ Virtual Machine. Alternatively, the script code can be written in other script code languages such as VBScript or Perl. However, the code can be written in other software or machine languages including but not limited to C++ or C#. As a further alternative, the algorithms can be resident in the machine can be programmed in any common embedded processor code.

Selecting a menu item by pressing a graphical key on the touch sensitive menu screen 310 triggers an event which causes virtual machine 318 to interpret and execute the code associated with the selected graphical key. The code can be associated with selectable menu items (i.e., graphical keys or buttons). One menu item is configured to perform the task of initiating a scan of an image using scanning mechanism 305. Another menu item is configured to perform the task of receiving input of a specific address to which message data is to be transmitted via intranet 104 and interconnecting network 118. Still another menu item can be configured to perform the task of initiating a retrieval of an address that was previously stored in memory 306. Memory 306 can contain address information that can be requested to be displayed upon touch sensitive menu screen 310. When the address information is retrieved from memory 306, the user can select one or more displayed addresses to which message data will be transmitted over intranet 104 and interconnecting network 118 to one or more network resources seen in FIG. 2, including but not limited to servers or computing systems 112, 114, 116 and/or transmitter devices 102-*i*, 106-*i*, 110. Alternatively, the user can directly enter a specific address into the transmitter device 102 using touch sensitive menu screen 310. Controller 300 executes processes resident in a communicative link interface for transmission over a wired and/or wireless link to intranet 104.

When a user enters a command displayed upon touch sensitive menu screen 310 to start a scanning operation, the user places a set of documents into a sheet feeder device associated with transmitter device 102. The sheet feeder device then physically serves each sheet in the set of documents to scanning mechanism 305. CPU 302 then generates a bit map or data in a first format that is a digital representation of the scanned documents. The transmitter device can then convert the data to a second format. For example, the scanned object data may be included in the message data as an attached file. The scanned object data may include Portable Document Format (*.PDF) formatted data, graphical image file format (*.GIF) formatted data, tagged image file format (*.TIF) formatted data, Joint Photographic Experts Group (JPEG) formatted data, bit-map formatted data, optical character recognition (OCR) related data, American Standard Code for Information Interchange (ASCII) formatted data, and/or other forms of encoded data, including, e.g., encrypted data, etc.

When the user enters a command displayed upon touch sensitive menu screen 310 to enter or retrieve an address, transmitter device 102 coordinates the input of the address. Controller 300 then executes a user message compositing routine, preferably stored in memory 306, that assemblies message data. The message data so assembled includes the address input or otherwise designated by the user and any data that is in a prescribed format for a digital representation of the scanned documents, and can also include any message text entered by the user upon touch sensitive menu screen 310. The message data is then sent by a wired and/or wireless link to intranet 104 to one or more addresses specified by the user and/or specified by default by the transmitter device 102. From internet 104 a communication is established with one or more servers and/or computing systems 112, 114, 116 that are also in communication with interconnecting network 118. The servers and/or computing systems 112, 114, 116 can serve each address to which the transmission of the message data from any of transmitter devices 102-*i*, 106-*i*, and 110-*i* is to be sent.

CPU(s) 302 is configured to perform the operations described above using various executable modules of memory 306, such as an address storage/retrieval routine, a communicative link interface routine, and a user message compositing routine, any of which can each be implemented in software or firmware.

In one embodiment of the invention, an address storage/retrieval routine executing on CPU(s) 302 receives input of an address from a user at touch sensitive menu screen 310 or retrieves a list of stored addresses. The list of addresses are displayed on touch sensitive menu screen 310 in a hierarchical list. The list can be sorted alpha-numerically. The user can either select from among the displayed addresses or input the characters of a specific address using a 'drill-down' function of the menu. The drill-down menu format and the displayed list of retrieved addresses assist the user in locating an address of interest.

FIG. 4 shows server 112 in communication with interconnecting network 118 and having a processor 328, a volatile memory 330, and a memory 332. Memory 332 includes a device driver 320, a server module 322, a Server Transmitter device (DS) log file 324, and application routines 326 for storage of software. DS log file 324 can be a repository for all job entries in each log file of each transmitter device over which server 112 is intended to have monitoring responsibility. Application routines 326 is a storage location for programs that can be executed by processor 328 on server 112. One such routine is a recovery procedure routine for DS log file 324, discussed below with respect to FIG. 9.

Exemplary Embodiment of Transmitter Device Capture and Transmission

Figure 5:
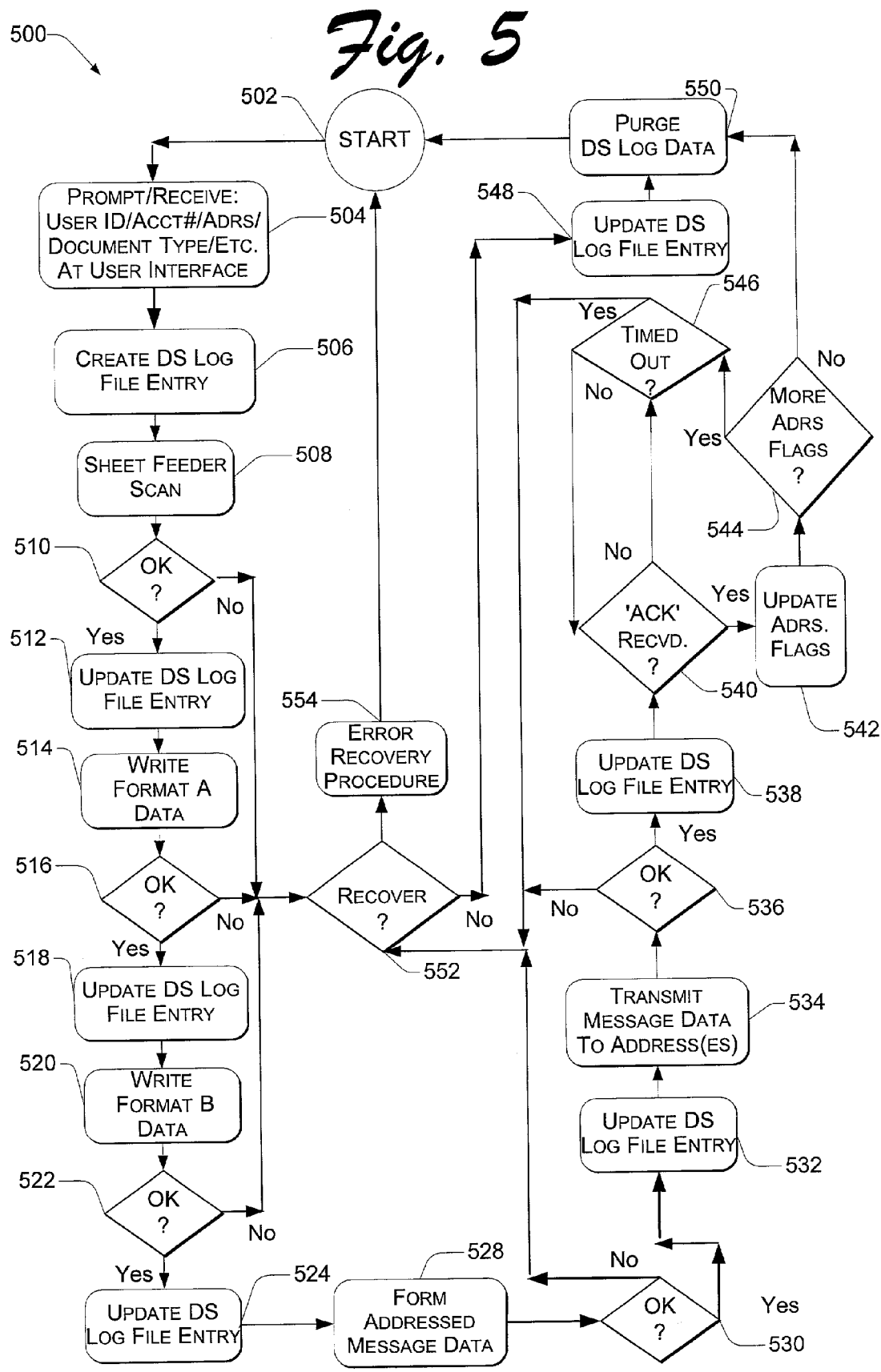
FIG. 5 is a flow diagram, according to an embodiment of the present invention, depicting a method for use in a computing and communication environment having a transmitter device in a system as in FIG. 2, for example, in accordance with certain exemplary embodiments of the present invention.

FIG. 5 shows a flow diagram, according to an embodiment of the present invention, depicting a method for using a transmitter device. With this in mind, CPU(s) 302 can be configured to perform the operations described below. By way of further example, a flow diagram is depicted in FIG. 5 to illustrate certain exemplary functions that can be performed using CPU 302 and the other resources in transmitter device 102. Here, a process 500 is provided.

Process 500 begins at starting block 502 which direct a process flow to block 504. At block 504, a user is prompted upon a display to enter an option to scan and send a document. In block 504, transmitter device 102 displays a prompt upon touch sensitive menu screen 310. In order to display the prompt, server module 314 of memory 306 in transmitter device 102 can serve a menu page that is stored in memory 306 to CPU 302 for execution of code. The code being executed by CPU 302 effects a function to be performed by transmitter device 302, such as receiving input from a user that is entered upon touch sensitive menu screen 310, or the initiation of a function by the user depressing a function related virtual button that is displayed upon touch sensitive menu screen 310. The code will preferably be executed in conjunction with an interpretation of the menu page. Note that in certain implementations, the menu page can be directly interpreted by code executing on CPU 302 without any prior storage in menu documents in memory 306 or use of server module 314 in transmitter device 102.

A prompt on a menu screen at block 504 solicits input from a user to enter the user's User ID, an account number for the job of documents to be scanned and transmitted, one or more addresses to which the scanned documents is to be sent, the type of the addresses to which the documents are to be sent (e.g. email server addresses, facsimile server addresses, destination web site addresses, a local file folder at document servers, or other locations on an interconnecting network). The prompt may also solicit message text from the user that will be sent with the transmission or will otherwise be stored in the log file of the transmitter device.

At block 506, an entry for the job is created in the log file of the transmitter device. The entry includes the input made by the user at the user interface which are the User ID input, the account number, the address(es), and the document type. The transmitter device generates a Log File Entry Number and the time stamp of the initiation of the job. The Log File Entry Number can be a chronological number, a random number, or a number having a particular intelligence or significance. At block 508, the user places a stack of pages into a sheet feeder of the transmitter device and the scanning mechanism 305 scans in the pages in the sheet feeder so as to capture images therefrom. The scanning mechanism 305 scans in documents and creates image data therefrom at block 508 and the process 500 moves to block 510 where there success of the scanning operation is tested. If the sheet feeder jams or the scanning mechanism 305 malfunctions, process 500 moves to block 552. Otherwise, process 500 move to block 512 where the log file is updated. The update to the log file includes a new time stamp and the number of scanned pages. Additionally, the job status is updated to indicate that block 508 was successfully accomplished at the given new time stamp.

At block 514, process 500 forms Format A data from the captured images of the scanned pages. If the Format A data is successfully created, the Format A data is written at block 520 as a subcomponent to the Job Image Data component in the log file entry of the log file. Additionally, at block 518, the size of the Format A data is recorded, as is the job status to indicate that block 514 was successfully accomplished at a given time stamp. If block 514 fails as tested at block 516, the discrepancy will be seen in the log file and process 500 moves to block 552. Otherwise, process 500 moves from block 518 to block 520.

At block 520, process 500 writes Format B data as a subcomponent to the Job Image Data component in the log file entry of the log file. Format B data is formed from Format A data that is also stored in the log file entry. If the Format B data is successfully created at block 520, the Format A data in the entry can optionally be purged from the entry at block 524. At block 524, the size of the Format B data is recorded, as is the job status to indicate that block 520 was successfully accomplished at a given time stamp that is written into the entry. If block 520 fails as tested at block 522, the discrepancy will be seen in the log file and process 500 moves to block 552. Otherwise, process 500 moves from block 524 to block 528.

At block 528, process 500 forms message data using Format B data. The formation of the message data include addressing the message data to its intended recipient(s) as specified by the user and/or default address (es) assigned by the transmitter device. Other input received from the user may also be included in the message data, such as a textual message entered by the user upon the user interface. If the message data is successfully formed at block 528, the entry in the log file is updated at block 532, where the job status is recorded to indicate that block 528 was successfully accomplished at a given time stamp. If block 528 fails as tested at block 530, the discrepancy will be seen in the entry in the log file and process 500 moves to block 552. Otherwise, process 500 moves from block 532 to block 534.

At block 534, process 500 transmits the addressed message data to the one or more specified addresses. The message data can be an electronic message having a file attached thereto that contains the Format B data. Other forms of the message data are also contemplated. If the message data is successfully transmitted at block 534, the entry in the log file is updated at block 538, where the job status is recorded to indicate that block 534 was successfully accomplished at a given time stamp. If block 534 fails as tested at block 536, the discrepancy will be seen in the entry in the log file and process 500 moves to block 552. Otherwise, process 500 moves from block 538 to block 540.

At block 540, the transmitter device identifies whether or not an acknowledgement (e.g. 'ACK') has been received from each of the one or more addresses to which the message data was transmitted at block 534. Once an ACK has been received from one of the addresses, process 500 moves to block 542 where the acknowledging address is flagged in the address subcomponent of the Job Tracking History component of log file. The process 500 then move from block 542 to block 544 to query whether all addresses in the entry have been flagged as having been acknowledged to have been received. If more addresses remain to be flagged, process 500 moves from block 544 to block 546 to determine whether the time stamp is the entry of the log file for the particular job is less than a predetermined duration from the system date and time of the transmitter device. If so, the process 500 returns to block 540 to continue to test for additional 'ACK' receipts for the remaining unflagged addresses. If all addresses have been flagged, then process 500 moves from block 544 to block 550 where the Format B data is purged from the Job Image Data component of the entry in the log file, the time stamp is updated, and the job status is changed to indicate a completion of the job. Process 500 then moves back to the starting block 502. If all addresses have not been flagged within the predetermined duration, then the discrepancy will be seen in the entry in the log file and process 500 moves to block 552.

At block 552, the user is prompted to input a selection of an option to attempt to recover message data that the user had previously tried to transmit to one or more addresses. If the user selects the option not to recover from the discrepancy, process 500 moves from block 552 to block 548 at which the entry in the log file can be purged of any data in the Job Image Data component of the entry. Additionally, the job status is updated to indicate the selection of the option not to recover, and the time stamp is updated as well. Process 500 then returns to starting block 502.

At any time during process 500, all or a portion of the entries in the log file of the transmitter device can be communicated to an administrative entity by remote access using interconnecting network 118 to follow up with any required maintenance or other investigation. By way of example as seen in FIGS. 2 and 4, a user of servers and/or computing systems 112, 114, 116 can function as such an administrative entity that can be used to copy into server DS log file 324 each of DS log file 316 of transmitter devices 102-*i*, 106-*i*, and 110.

If the user responds to the prompt at block 552 to select the option to recover from a discrepancy in an intended transmission, process 500 moves to block 554 where several error recovery procedures can be selected in accordance with several embodiments of the present invention. Examples of these error recovery procedures are seen in FIGS. 6-9 and are discussed below.

Exemplary Embodiments of an Error Recovery Routine

FIG. 6 shows a flow diagram, according to an embodiment of the present invention, depicting a method for using a transmitter device which can be performed using CPU(s) 302 and the other resources in transmitter device 102. Here, a process 600 is provided. Process 600 begins at step 602 where the transmitter device has experienced a power failure, a fatal operating system error, a transmission failure, and/or a program failure. Process 600 moves to block 604 where a reset occurs, the operating system is reloaded, and/or the failed program is restarted. At step 608, the transmitter device searches the job status field of each entry in the log file to locate any job that is incomplete. An incomplete job is a job that has not been transmitted from the transmitter device or that has been sent from the transmitter device but has not been acknowledged as having been received by the addressed recipient. An incomplete job(s) appears as a job entry (ies) having a discrepancy (ies) in the log file. When so located, the job status of each such relevant entry in the log file is queried to determine the last successfully completed block in process 500. When so determined, process 600 moves from block 608 to block 612 where the number of retries field is updated in the incomplete log file entry and the incomplete entry is then sent to back to process 500 to the block that follows the last block of process 500 that was last successfully completed as indicated by the job status field in the entry. Process 600 cycles between blocks 608, 610, and 612 until all incomplete jobs in the log file have been disposed of. Process 600 then moves from block 610 and the recovery procedure terminates at block 614. Process 500 is then resumed by moving from block 554 to starting block 502.

FIG. 7 shows a flow diagram, according to another embodiment of the present invention, depicting a method for using a transmitter device which can be performed using CPU(s) 302 and the other resources in transmitter device 102. Here, a process 700 is provided. Process 700 begins at step 702 where the transmitter device has experienced a power failure, a fatal operating system error, a transmission failure, and/or a program failure. Process 700 moves to block 704 where a reset occurs, the operating system is reloaded, and/or the failed program is restarted. At step 706, the transmitter device searches the job status field of each entry in the log file to locate any job that is incomplete. When so located, a pair of comparisons is performed. A first comparison is made between the number of retries field in the entry and a predetermined maximum. A second comparison is made between the Update Time Stamp field in the entry to a system clock time kept in the transmitter device to determine the passage of time from the last update. If either number of retries exceeds the predetermined maximum or the passage of time exceeds a predetermined duration from the system date and time of the transmitter device, then process 700 moves from block 710 to block 711. At block 711, the status of the entry is changed from being incomplete to being set to identify a retired status and the Update Time Stamp field is set to the system clock of the transmitter device. The retired status represents a time-out or excessive retries for the entry. Optionally, the transmitter device can also be configured so that the Job Image Data can be purged from the entry at block 711. After block 711, process 700 moves to block 706 to locate another incomplete entry in the log file of the transmitter device.

If the pair of comparisons at block 710 determines that neither the number of retries exceeds the predetermined maximum nor the passage of time exceeds the predetermined duration, then process 700 moves from block 710 to block 712 where the job status of the entry in the log file is queried to determine the last successfully completed block in process 500. When so determined, block 712 updates the number of retries field in the incomplete log file entry and the incomplete entry is then sent back to process 500 to the block that follows the last block of process 500 that was last successfully completed as indicated by the job status field in the entry. Process 700 cycles between blocks 706 through 712 until all incomplete jobs in the log file have been so disposed of as described. Process 700 then moves from block 708 and the recovery procedure terminates at block 714. Process 500 is then resumed by moving from block 554 to starting block 502.

FIG. 8 shows a flow diagram, according to yet another embodiment of the present invention, depicting a method for using a transmitter device which can be performed using CPU(s) 302 and the other resources in transmitter device 102. Here, a process 800 is provided. Process 800 begins at step 802 where the transmitter device has experienced a power failure, a fatal operating system error, a transmission failure, and/or a program failure. Process 800 moves to block 804 where a reset occurs, the operating system is reloaded, and/or the failed program is restarted. At step 806, the transmitter device searches the job status field of each entry in the log file to locate any job that is incomplete. When so located, each address in the log file entry of the incomplete job is re-addressed at block 810. The re-assigned addresses can be that of respective backup servers that correspond to each original address. Upon reassignment of each of the original addresses, a transmission is made at block 810 from the transmitter device to each re-assigned address. Process 800 then moves from block 810 to block 812 where the status of the incomplete job is changed to indicate transmission to a backup server and the Update Time Stamp field is set to the system clock of the transmitter device. Block 812 can also initiate a purge of the Job Image Data for the entry in the log file. Process 800 then moves to block 806 and cycles from there between blocks 810 and 812 until all incomplete jobs in the log file have been so disposed of as described. Process 800 then moves from block 808 and the recovery procedure terminates at block 814. Process 500 is then resumed by moving from block 554 to starting block 502.

Other than the recovery procedure that terminates at block 814, another recovery mechanism can be used such that the current position in the job can be kept so that the user can be instructed to start scanning at a certain page number 'N', where N is the next page that was not correctly scanned. As such, the job recovery can be initiated for a jammed scan job that is lengthy (e.g. where a jam, or failure to properly scan a job, has occurred on page number Ninety-six (96) of a Ninety-nine (99) page document). In such a circumstance in the recovery mechanism, instructions could be presented via a user interface to a user.

FIG. 9 shows a flow diagram, according to still another embodiment of the present invention, depicting a method for using a transmitter device which can be performed using CPU(s) 302 and the other resources in transmitter device 102. Here, a process 900 is provided. Process 900 begins at step 902 where the transmitter device has experienced a power failure, a fatal operating system error, a transmission failure, and/or a program failure. Process 900 moves to block 904 where a reset occurs, the operating system is reloaded, and/or the failed program is restarted. At step 906, an administrator for the transmitter device initiates a process to search the job status field of each entry in the log file to locate any job that is incomplete. When so located at block 908, the administrator can retrieve the incomplete job at block 910 from the transmitter device to a computing system, such as a personal computer (PC). Once the administrator's computer system has the incomplete job at block 910, the administrator can complete and send the job from the computing system to the one or more original addresses or to other addresses as selected by the administrator. Alternatively, the administrator can print out the job at a printer with which the administrator's computer system is in communication. Process 900 then moves from block 910 to block 912 where the status of the incomplete job is changed to indicate intervention by the administrator and the Update Time Stamp field is set to the system clock of the transmitter device. Block 912 can also initiate a purge of the Job Image Data for the entry in the log file. Process 900 cycles between blocks 906 through 912 until all incomplete jobs in the log file have been so disposed of as described. Process 900 then moves from block 908 and the recovery procedure terminates at block 914. Process 500 is then resumed by moving from block 554 to starting block 502.

Block 906 in process 900 can be initiated without human intervention, such as by an automatic program running on a server. By way of example and not by way of limitation, and as seen in FIG. 2, when any transmitter device 102-*i*, 106-*i*, 110 undergoes a reset/reload/restart at block 904, any of servers/computing systems 112, 114, and 116 can be programmed to automatically initiate and execute blocks 906 through 912 of process 900. Alternatively, when any transmitter device 102-*i*, 106-*i*, 110 undergoes a reset/reload/ restart at block 904, message data can be transmitted to an administrator email address detailing incomplete entries that remains in the log file. By way of example, the email address can be associated with any of servers/computing systems 112, 114, and 116. Upon reading the email, a human administrator can then initiate the execution of blocks 906 through 912 of process 900. In this way, a human administrator or administrative entity can pursue solutions to problematic transmissions among transmitter devices being monitored by the same. Of course, the incomplete entries in the log file of each transmitter device can be communicated to the human administrator or administrative entity by means other than email, such as a hard copy printed report or a display upon a display terminal. Additionally, the log file information of the transmitter device can be copied to a server or computing system that can be used by the human administrator or administrative entity to track and report on the performance and usage of the transmitter devices being monitored.

Thus, although some preferred embodiments of the various methods, systems, and programs of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the scope of the invention as set forth and defined by the following claims.

What is claimed is:

1. A computer-readable medium having computer-executable instructions which, when executed on a processor, direct a computer to perform a method comprising:
   optically scanning at least one object to form a corresponding message data in a storage;
   transmitting the message data in the storage over an interconnecting network to an address of an addressed recipient;
   only after receiving an acknowledgement of receipt of the message data from the addressed recipient through the interconnecting network, automatically deleting the message data from the storage.

2. The computer-readable medium as defined in claim 1, wherein the method further comprises:
   retransmitting the message data in the storage over the interconnecting network to the address of the addressed recipient when the acknowledgement of receipt of the message data has not been received after a predetermined duration from the transmitting.

3. The computer-readable medium as defined in claim 2, wherein the method further comprises:
   periodically repeating the retransmitting for a predetermined number of times during which the acknowledgement of receipt of the message data has not been received; and
   automatically deleting the message data from the storage after said retransmitting has occurred the predetermined number of times without receiving the acknowledgement of receipt of the message data from the addressed recipient.

4. The computer-readable medium as defined in claim 1, wherein the method further comprises, after the optically scanning and prior to the transmitting, loading an operating system of a transmitter device without the deleting the message data in the storage, wherein the transmitter device performs:
   the optically scanning;
   the transmitting the message data;
   the receiving the acknowledgement; and
   the deleting the message data in the storage.

5. The computer-readable medium as defined in claim 4 wherein the method further comprises, prior to forming the corresponding message data in storage:
   converting and storing the scanned object data in a first data format in the transmitter device;
   converting and storing the scanned object data in the first format into a second format in the transmitter device; and
   forming the scanned object data in the second format into the message data in storage.

6. The computer-readable medium as defined in claim 5, wherein:
   the loading the operating system occurs prior to the converting and storing the scanned object data in the first format into the second format; and
   prior to the transmitting the message data, and after the loading the operating system, the transmitter device performs:
   the converting the scanned object data in the first format into the second format; and
   the forming the scanned object data in the second format into the message data in storage.

7. The computer-readable medium as defined in claim 5, wherein:
   the loading the operating system occurs prior to the forming the scanned object data in the second format into the message data in storage; and
   prior to the transmitting the message data and after the loading the operating system, the transmitter device performs:
   the forming the scanned object data in the second format into the message data in storage.

8. The computer-readable medium as defined in claim 4, wherein the transmitter device is selected from the group consisting of a digital camera, a hand held scanner, a desk top scanner, a fax machine, a copier, a multifunction peripheral (MFP), and a digital network copier.

9. The computer-readable medium as defined in claim 1, wherein the method further comprises:
   retransmitting the message data in storage over the interconnecting network to a back up address of a backup recipient when the acknowledgement of receipt of the message data has not been received after a predetermined duration from the transmitting.

10. The computer-readable medium as defined in claim 1, wherein the message data in storage has a format selected from the group consisting of an ASCII formatted data format, a word processor format, a spread sheet data format, a PDF data format, a Microsoft Power Point® software data format, a GIF data format, a TIFF data format, a JPEG data format, a bit-map data format, an OCR data format, and an encoded data format.

11. The computer-readable medium as defined in claim 1, wherein the address of the addressed recipient is selected from the group consisting of:
   an electronic mail (email) address at an email server on a network;
   a file folder address at a server on a network; and
   a Web site address at a server on a network.

12. The computer-readable medium as defined in claim 1, wherein the storage of the corresponding message data is selected from the group consisting of:
   a transmitter device in communication with the interconnecting network;
   a server in communication with the interconnecting network; and
   a combination of the foregoing.

13. The computer-readable medium as defined in claim 1, wherein the method further comprises, prior to the transmitting the message data over an interconnecting network to an address of an addressed recipient, transmitting an electronic mail message over the interconnecting network to the address of the addressed recipient, wherein the electronic mail message provides notice that the corresponding message data is to be transmitted.

14. The computer-readable medium as defined in claim 1, wherein:
   the corresponding message data in storage is stored in a plurality of addresses accessible through the interconnecting network; and
   deleting the message data in storage deletes the message data at some, but not all, of the plurality of addresses accessible through the interconnecting network.

15. A computer-readable medium having computer-executable instructions which, when executed on a processor, direct a computer to perform a method comprising:
   optically scanning with a scanning mechanism of a transmitter device at least one object to form corresponding scanned object data in a first data format that is stored in the transmitter device;
   converting the scanned object data in the first data format into a second format that is stored in the transmitter device;
   forming the scanned object data in the second format into message data with the transmitter device;
   transmitting the message data from the transmitter device over an interconnecting network to an address of an addressed recipient;
   after receiving an acknowledgement at the transmitter device of receipt of the message data from the addressed recipient through the interconnecting network, deleting from storage in the transmitter device at least one of:
   the scanned object data in the first data format;
   the scanned object data in the second data format; and
   the message data.

16. The computer-readable medium as defined in claim 15, wherein the method further comprises:
retransmitting the message data from the transmitter device over the interconnecting network to the address of the addressed recipient when the acknowledgement at the transmitter device of receipt of the message data from the addressed recipient has not been received after a predetermined duration from the transmitting.

17. The computer-readable medium as defined in claim 16, wherein the method further comprises:
periodically repeating the retransmitting for a predetermined number of times during which the acknowledgement at the transmitter device of receipt of the message data from the addressed recipient has not been received; and
deleting, after said retransmitting has occurred the predetermined number of times without receiving the acknowledgement at the transmitter device of receipt of the message data from the addressed recipient, at least one of:
the scanned object data in the first data format;
the scanned object data in the second data format; and
the message data.

18. The computer-readable medium as defined in claim 15, wherein the method further comprises, after the optically scanning and prior to the transmitting, loading an operating system of the transmitter device without the deleting one or more of:
the scanned object data in a first data format;
the scanned object data in a second data format; and
the message data.

19. The computer-readable medium as defined in claim 18, wherein:
the loading the operating system of the transmitter device occurs prior to the converting the scanned object data in the first data format into the second format; and
prior to the transmitting the message data from the transmitter device, and after the loading the operating system of the transmitter device, the transmitter device performs:
the converting the scanned object data in the first data format into the second format;
the forming the scanned object data in the second format into the message data with the transmitter device.

20. The computer-readable medium as defined in claim 19, wherein:
the loading the operating system of the transmitter device occurs prior to the forming the scanned object data in the second format into the message data with the transmitter device; and
prior to the transmitting the message data and after the loading the operating system, the transmitter device performs:
the forming the scanned object data in the second format into the message data with the transmitter device.

21. The computer-readable medium as defined in claim 15, wherein the method further comprises:
retransmitting from the transmitter device the message data in storage in the transmitter device over the interconnecting network to a back up address of a backup recipient when the acknowledgement of receipt of the message data has not be received by the transmitter device after a predetermined duration from the transmitting.

22. The computer-readable medium as defined in claim 15, wherein:
the first data format is selected from the group consisting of a bit map format, a GIF data format and a TIFF data format; and
the second data format is selected from the group consisting of an ASCII formatted data format, a word processor format, a spread sheet data format, a PDF data format, a Microsoft Power Point software data format, a JPEG data format, an OCR data format, and an encoded data format.

23. The computer-readable medium as defined in claim 15, wherein the address of the addressed recipient is selected from the group consisting of:
an electronic mail (email) address at an email server on a network;
a file folder address at a server on a network; and
a Web site address at a server on a network.

24. The computer-readable medium as defined in claim 15, wherein the scanned object data in the second format that is stored in the transmitter device is also stored at a server in communication with the interconnecting network.

25. The computer-readable medium as defined in claim 15, wherein the method further comprises, prior to the transmitting the message data over an interconnecting network to an address of an addressed recipient, transmitting an electronic mail message over the interconnecting network to the address of the addressed recipient, wherein the electronic mail message provides notice that the corresponding message data is to be transmitted.

26. A transmitter device comprising:
means for optically scanning at least one object to form a corresponding message data in a storage;
means for transmitting the message data in the storage over an interconnecting network to an address of an addressed recipient;
means for automatically deleting the message data from the storage only after receiving an acknowledgement of receipt of the message data from the addressed recipient through the interconnecting network.

27. The transmitter device as defined in claim 26, further comprising:
means for retransmitting the message data in the storage over the interconnecting network to the address of the addressed recipient when the acknowledgement of receipt of the message data has not been received after a predetermined duration from the transmitting.

28. The transmitter device as defined in claim 27, further comprising:
means for periodically repeating the retransmitting for a predetermined number of times during which the acknowledgement of receipt of the message data has not been received; and
means for automatically deleting the message data from the storage after said retransmitting has occurred the predetermined number of times without receiving the acknowledgement of receipt of the message data from the addressed recipient.

29. The transmitter device as defined in claim 26, further comprising, means, functioning after the optically scanning and prior to the transmitting, for loading an operating system for the transmitter device without the deleting the message data in the storage.

30. The transmitter device as defined in claim 29, further comprising means, functioning prior to forming the corresponding message data in storage, for:
converting and storing the scanned object data in a first data format in the transmitter device;

converting and storing the scanned object data in the first format into a second format in the transmitter device; and forming the scanned object data in the second format into the message data in storage.

31. The transmitter device as defined in claim 30, wherein:

the means for loading the operating system functions prior to the means for converting and storing the scanned object data in the first format into the second format; and prior to the functions of the means for transmitting the message data, and after the functioning of the means for loading the operating system, there is a functioning of the means for:

converting and storing the scanned object data in the first format into the second format; and forming the scanned object data in the second format into the message data in storage.

32. The transmitter device as defined in claim 30, wherein:

the means for the loading the operating system functions prior to the means for forming the scanned object data in the second format into the message data in storage; and the means for forming the scanned object data in the second format into the message data in storage functions prior to the means for transmitting the message data and after the means for loading the operating system.

33. The transmitter device as defined in claim 26, further comprising:

means for retransmitting the message data in the storage over the interconnecting network to a back up address of a backup recipient when the acknowledgement of receipt of the message data has not been received after a predetermined duration from the transmitting.

34. A computer readable medium having computer executable instructions, the computer executable instructions being executable by logic of a transmitter device in communication with an interconnecting network, the computer executable instructions comprising:

a code segment to optically scan at least one object to form a corresponding message data in a storage;

a code segment to transmit the message data in the storage over the interconnecting network to an address of an addressed recipient; and a code segment to automatically delete the message data from the storage only after the transmitter device has received an acknowledgement of receipt of the message data from the addressed recipient through the interconnecting network.

35. The computer readable medium as defined in claim 34, further comprising:

a code segment to retransmit the message data in the storage over the interconnecting network to the address of the addressed recipient when the acknowledgement of receipt of the message data has not been received by the transmitter device after a predetermined duration from the transmitting.

36. The computer readable medium as defined in claim 35, further comprising:

a code segment to periodically repeat the code segment to retransmit for a predetermined number of times during which the acknowledgement of receipt of the message data has not been received; and a code segment to automatically delete the message data from the storage after the code segment to retransmit has executed the predetermined number of times without the transmitter device receiving the acknowledgement of receipt of the message data from the addressed recipient.

37. The computer readable medium as defined in claim 34, further comprising a code segment to access a data structure that includes one or more fields of:

a user ID;
an account number;
at least one address and a corresponding indicator acknowledgement of receipt of a transmission to said at least one address;
a time stamp;
a size;
a number of scanned pages;
a job status;
a number of retries;
a document type;
the message data in storage.

38. The computer readable medium as defined in claim 37, wherein:

the code segment accesses a plurality of the data structures;
each said data structure is representative of the number of scanned pages to be transmitted by the transmitter device;
each said time stamp is representative of the last change to the corresponding data structure;
each said job status is representative of a last process to which the corresponding data structure was subjected;
each said document type is selected from the group consisting of an electronic mail (email) message for delivery to an email server, a document for delivery to a destination web site, a document for delivery to a local file folder at a document server, and a facsimile of a document to be delivered to a facsimile server.

39. A computer readable medium having computer executable instructions, the computer executable instructions being executable by logic of a transmitter device in communication with an interconnecting network, the computer executable instructions comprising:

a code segment to optically scan at least one object to form a corresponding message data in a storage;

a code segment to transmit the message data in the storage over the interconnecting network to an address of an addressed recipient;

a code segment to automatically delete the message data from the storage after the transmitter device has received an acknowledgement of receipt of the message data from the addressed recipient through the interconnecting network;

a code segment to form a data structure after a performance of the optical scan of at least one object to form a corresponding message data in storage, said data structure including:

a number of pages to be scanned; and
a number of pages that were scanned;

a code segment to:

display a prompt on a user interface when the number of pages that were scanned is less than the number of pages to be scanned pages, wherein the prompt requests a starting page to begin a scanning.

40. A system comprising:

a transmitter device having a sending network address on the interconnecting network and including:

means for optically scanning at least one object to form a corresponding message data in a storage;

means for transmitting the message data in the storage over the interconnecting network to an address of an addressed recipient; and means for automatically deleting the message data from the storage after receiving an acknowledgement of receipt of the message data from the addressed recipient through the interconnecting network;

a network device, in communication with the transmitter device through the interconnecting network, including:

means for receiving the message data at the address of the addressed recipient; and means for transmitting the acknowledgement of receipt of the message data from the addressed recipient through the interconnecting network to the sending network address.

41. The system as defined in claim 40, wherein the transmitter device further comprises means for retransmitting the message data in the storage over the interconnecting network to the address of the addressed recipient when the acknowledgement of receipt of the message data has not been received after a predetermined duration from the transmitting.

42. The system as defined in claim 41, wherein the transmitter device further comprises:

means for periodically repeating the retransmitting for a predetermined number of times during which the acknowledgement of receipt of the message data has not been received; and means for automatically deleting the message data from the storage after said retransmitting has occurred the predetermined number of times without receiving the acknowledgement of receipt of the message data from the addressed recipient.

* * * * *

UNITED STATES PATENT AND TRADEMARK OFFICE
CERTIFICATE OF CORRECTION

PATENT NO. : 7,301,658 B2 Page 1 of 1
APPLICATION NO. : 10/126005
DATED : November 27, 2007
INVENTOR(S) : Steven G. Henry It is certified that error appears in the above-identified patent and that said Letters Patent is hereby corrected as shown below:

In column 20, line 7, in Claim 22, after "Point" insert -- ® --.

Signed and Sealed this

Tenth Day of June, 2008

JON W. DUDAS
*Director of the United States Patent and Trademark Office*